Feb. 8, 1966 W. H. BURKHART 3,234,512

KEYING METHOD AND APPARATUS

Filed March 9, 1961 3 Sheets-Sheet 1

INVENTOR.
WILLIAM H. BURKHART

BY Charles L. Johnson Jr.

ATTORNEY

| PATH | RADIATION A | B | INTERRUPTION C | D | BINARY E | TABLE F | G |
|---|---|---|---|---|---|---|---|
| | 1/0 | 0 | 0 | 1/0 | 0 | 0 | 0 |
| | 1/0 | 0 | 0 | 1/0 | 0 | 1 | 0 |
| | 1/0 | 1 | 1 | 0 | 1 | 1 | 1 |
| | 1/0 | 1 | 1 | 1 | 1 | 1 | 1/0 |
| | 1/0 | 0 | 0 | 1/0 | 0 | 1/0 | 1 |
| | 0 | 1 | 1/0 | 1/0 | 1 | 0 | 1/0 |
| | 1 | 1/0 | 1 | 1/0 | 1/0 | 0 | 1/0 |
| | 1/0 | 1 | 0 | 1/0 | 1 | 1 | 1/0 |
| | 1/0 | 1/0 | 1 | 1 | 1/0 | 1 | 1 |
| | 1/0 | 1 | 0 | 1/0 | 1 | 1 | 1/0 |
| | 1/0 | 1/0 | 1 | 1 | 1/0 | 1 | 0 |

NUMERICAL TRACING

INVENTOR.
WILLIAM H. BURKHART

BY Charles L. Johnson Jr.
ATTORNEY

Feb. 8, 1966 W. H. BURKHART 3,234,512

KEYING METHOD AND APPARATUS

Filed March 9, 1961 3 Sheets-Sheet 3

INVENTOR.
WILLIAM H. BURKHART

BY Charles L. Johnson Jr.

ATTORNEY

3,234,512
KEYING METHOD AND APPARATUS

William H. Burkhart, Short Hills, N.J., assignor to Monroe International Corporation, a corporation of Delaware Filed Mar. 9, 1961, Ser. No. 94,557
4 Claims. (Cl. 340—146.3)

This invention relates to a method and apparatus for keying information and more particularly to an electronic keyboard.

In the electronic computing and communication arts a major step in practically all phases of operation occurs when the human communicates with the machine. The devices and apparatus by which this communication takes place is often complex, expensive and susceptible to human and machine error. Each of these objections exists to some degree in the majority of machines so far devised for humans to communicate with machines.

Inasmuch as handwriting is a rapid, economical and accurate means of expression the preferred type of apparatus should take advantage of the stated handwriting virtues and still be capable of distinguishing the intended shape in the presence of variation in size and orientation. It is to the simplification of this stated problem and to the extinguishment of these and other objections that the present invention is directed.

It is therefore a broad object of this invention to provide an improved method and apparatus for keying.

It is a further object of this invention to provide a keyboard of simple, inexpensive construction which by its nature improves operator accuracy.

It is a still further object of the invention to provide a keyboard operative in accordance with the tracing of well-known symbols.

A feature of the invention is the use of a radiating source and radiation receivers placed so as to define paths which are intersected by a tracing member when the tracing member is moved to trace a symbol such as a letter or number.

Another feature of the invention relates to the use of the operator's finger as the tracing member for outlining the symbol.

Another feature of the invention relates to the use of translating and readout apparatus for converting the keyboard information to other indicia such as pulse signals or printed numbers or letters.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

In the preferred embodiment of the invention by which the aforementioned objects are realized, a plurality of radiating devices and radiation receivers are arranged so as to form paths which intersect the line normally traced in outlining communication symbols such as numerals and letters. One such arrangement comprises two light sources and seven photocells arranged so that seven light paths normally exist between the light sources and the photocell receivers. When the operator uses his finger or other device to trace out the shape of the number or letter desired to be keyed into a machine, he interrupts one or more light paths to thereby generate one or more electrical signals which are automatically translated into indicia representative of the symbol keyed in by movement of the finger. Such indicia may be printed numbers, binary signals or any other form of information needed by the machine. In this manner it is seen, an accurate economical method and apparatus for human communication with machine is realized. It is of course not mandatory for the operator to use a finger, any opaque object being capable of providing the desired operation.

Figures 1, 2, 3, 5:
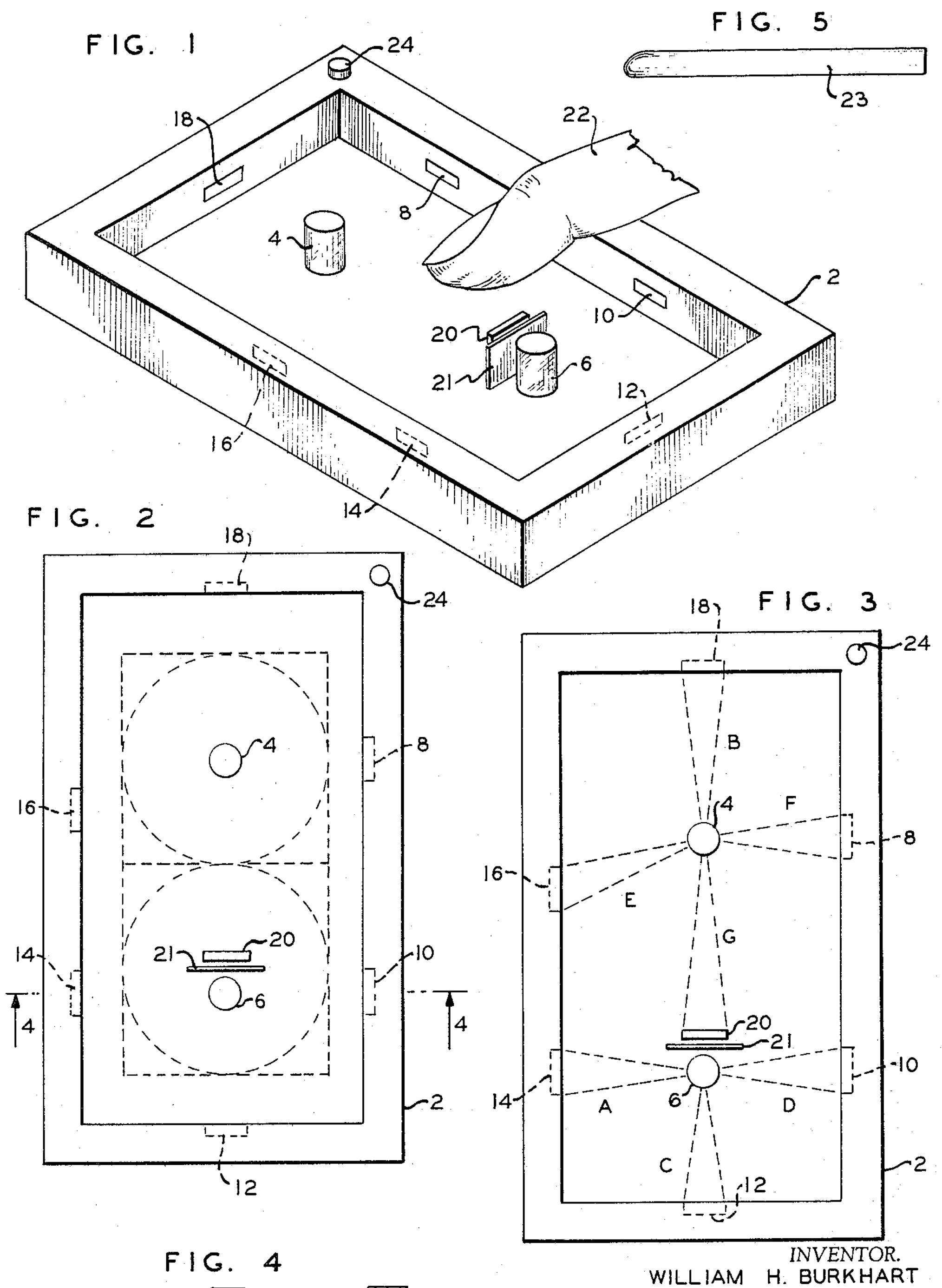
FIG. 1 is a perspective view of the keyboard apparatus.
FIG. 2 is a plan view of the keyboard of FIG. 1 with the normal paths for symbol generation illustrated.
FIG. 3 is a plan view of the keyboard of FIG. 1 which shows the normal radiation paths.
FIG. 5 illustrates a tracing member.
Figure 4:
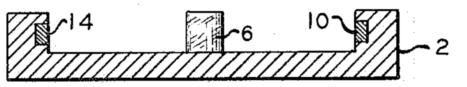
FIG. 4 is a cross-sectional end view of FIG. 1.

Referring now to FIG. 1, a preferred embodiment of the invention will be described. The keyboard of FIG. 1 comprises a frame 2 having recessed light sources 4 and 6 placed centrally within the frame so as to radiate light to the photocells 8, 10, 12, 14, 16, 18, and 20. By movement of the finger 22 the operator in tracing numerical or letter symbols will cause one or more interruptions in the photocell circuits by breaking the light beams. These interruptions may then be translated into data for operating indicating, storage or calculating equipment in accordance with the data traced by the operator's finger. A reset button 24 resets the keyboard in preparation for following data:

FIG. 2 illustrates the possible paths available to the operator in tracing out the symbols to be keyed while FIG. 3 shows the beams of light A, B, C, D, E, F, and G from the two light sources to the seven photocells. These beams comprise seven paths which may be interrupted by movement of the tracing object. FIG. 4 illustrates the recessed nature of the light sources and photocells. It should be noted that photocell 20 is isolated from the light source 6 so as to maintain the integrity of the light path from source 4 to photocell 20. Also it should be realized that the radiation sources 4 and 6 are not intended to be limited to light sources but that other radiation devices and appropriate receivers are contemplated. Also, the tracing member 22 of FIG. 1 may well find a substitute in any device which exhibits opaque characteristics toward the radiation involved. For example, with light sources as the radiating means a wooden rod 23 such as shown in FIG. 5 would be appropriate.

Figures 6, 7:
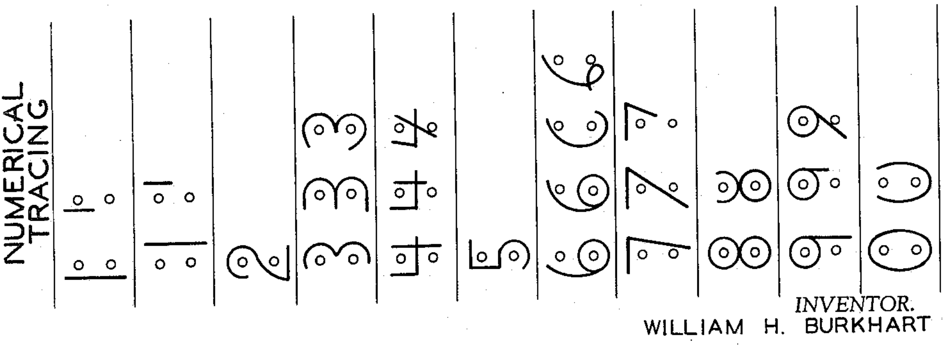
FIG. 6 illustrates numerals which may be traced on the keyboard.
FIG. 7 is a table of allowed radiation interruptions.

FIG. 6 illustrates possible configurations of numbers which an operator may trace while FIG. 7 outlines the binary requirements for converting the interrupted radiations to outputs representative of the numeral traced by the operator. The letter headings refer to the paths A, B, C, D, E, F, and G labeled at FIG. 3 while the binary 1 indicates a necessary interruption of that radiation path in order to key the corresponding numeral listed in the extreme left column of FIG. 7. In like manner a binary 0 represents a radiation path which must not be interrupted to generate the number listed to the left. An indication 1/0 represents an indifferent condition in that the occurrence or lack of a radiation interruption of that path is immaterial to the proper indication.

Figure 8:
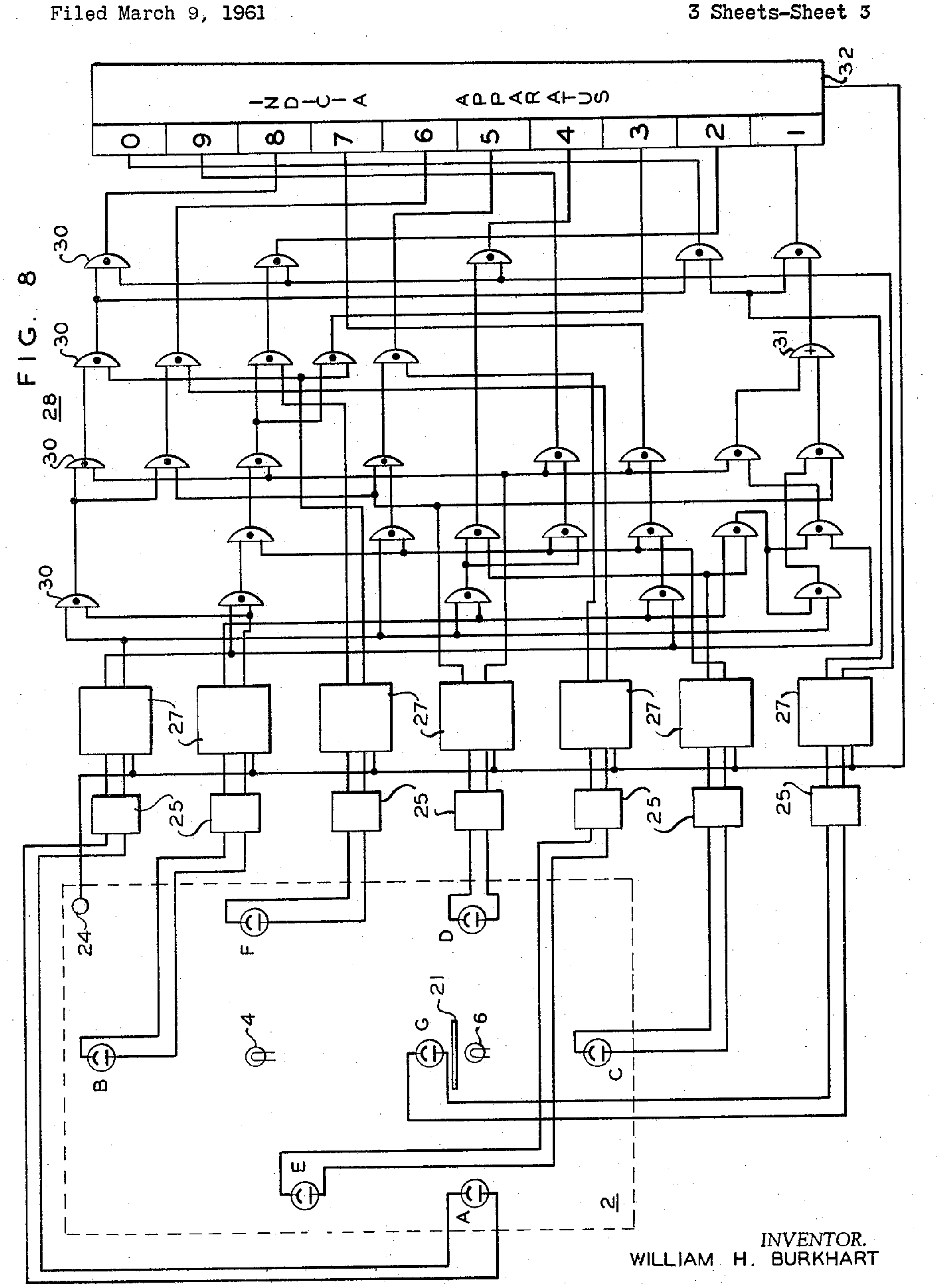
FIG. 8 is a schematic representation of the invention.

FIG. 8 illustrates a complete system including the keyboard 2 which activates one or more of the phototube circuits 25 to provide a potential change to activate the flip-flop circuits 27 whose outputs feed the translator 28. The phototube circuit 25 may be one of several well known types, one example being the circuit disclosed in U.S. Patent 2,417,092 to P. M. Smith for a Foul Detector and Indicator for Bowling Alleys. As contemplated here the need of device 25 is for a light sensitive circuit to operate a flip-flop circuit 27 upon the interruption of a light beam so as to provide a binary flip-flop output of 1 which is applied to the translator 28. The absence of an interrupted light beam provides a binary 0 from the flip-flop 27 to the translator 28. The translator 28, comprising the AND circuits 30 indicated by a dot and the OR circuit 31 indicated by a +, operates in accordance with the table of FIG. 7 to supply a signal to the indicating apparatus 32. The translator 28 may be any of the well-known type and of course may be varied somewhat to allow or reject the indication of a particular symbol variation if it results in confusion with other symbol indications or if precise symbol tracing is to be mandatory. The indicating or indicia apparatus 32 may be any one of several types which yields a mechanical, visual, electrical, or aural indication of the numeral or symbol traced by the operator, one example being an electric typing mechanism.

The reset button 24 shown in FIG. 1 and FIG. 8, along with the circuitry associated therewith in FIG. 8 provides a means for resetting the keyboard by resetting the flip-flops 27 upon the completion of an operation.

It is thus seen that a method and apparatus have been illustrated and described which embody the stated objects of the invention. More specifically an improved keying method and apparatus have been disclosed which utilize the direct interruption of radiation paths by an operator to key alphanumeric or other symbolic information.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. A translating device for translating the interruption of at least one light beam into at least one electrical signal comprising: a frame; omnidirectional light source means connected to and perpendicular to said frame; a plurality of photoelectric means connected to said frame and parallel with said light source means; said photoelectric means, each arranged to receive light from said light source means and thereby describe a pattern of light beams; a plurality of detection means, one for each of said plurality of photoelectric means and coupled to its associated photoelectric means to detect the interruption of the light beam striking its associated photoelectric means due to the presence of an object between said light source means and said associated photoelectric means; and output means coupled to all of said detection means to provide at least one electrical signal indicative the light beams in the pattern interrupted.

2. A translating device for translating the interruption of at least one light beam into at least one electrical signal comprising: a frame, two omnidirectional light source means connected to and perpendicular to said frame; said light source means being spaced apart from each other and from the periphery of said frame; a plurality of photoelectric means connected to said frame and parallel with said light source means; said photoelectric means, each arranged to receive light from said light source means and thereby describe a pattern of light beams; a plurality of detection means, one for each of said plurality of photoelectric means and coupled to its associated photoelectric means to detect the interruption of the light beam striking its associated photoelectric means due to the presence of an object between said light source means and said associated photoelectric means; and output means coupled to all of said detection means to provide at least one electrical signal indicative the light beams in the pattern interrupted.

3. A translating device for translating the interruption of at least one light beam into at least one electrical signal comprising: a frame, said frame having a base and a plurality of side walls arranged around the periphery thereof; two omnidirectional light source means connected to and perpendicular to said frame; said light source means being spaced apart from each other and from said side walls; a light baffle means positioned intermediate said two light source means, to prevent the overlapping of the light from said two light source means; a plurality of photoelectric means mounted in said side walls parallel with said light source means; said photoelectric means, each arranged to receive light from said light source means and thereby describe a pattern of light beams; a plurality of detection means, one for each of said plurality of photoelectric means and coupled to its associated photoelectric means to detect the interruption of the light beam striking its associated photoelectric means due to the presence of an object between said light source means and said associated photoelectric means; and output means coupled to all of said detection means to provide at least one electrical signal indicative the light beams in the pattern interrupted.

4. A translating device for translating the interruption of at least one light beam into at least one electrical signal comprising: a frame; having a base and a plurality of side walls arranged around the periphery thereof; two omnidirectional light source means connected to and perpendicular to said frame; said light source means being spaced apart from each other and from said side walls; a light baffle means positioned intermediate said two light source means, to prevent the overlapping of the light from said two light source means; seven photoelectric means, six of said photoelectric means being mounted at selected positions in said side walls and the seventh photoelectric means mounted adjacent said light baffle means whereby a pattern of seven discrete light beams is described; seven detection means, one associated with and coupled to one of said seven photoelectric means to detect the interruption of the light beam striking its associated photoelectric means due to the presence of an object between said light source means and said associated photoelectric means; and output means coupled to said seven detection means to provide at least one electrical signal indicative of the light beams in the pattern interrupted.

References Cited by the Examiner

UNITED STATES PATENTS

| | | | |
|---|---|---|---|
| 2,897,481 | 7/1959 | Shepard | 340—149 |
| 2,932,006 | 4/1960 | Glauberman | 340—149 |
| 3,081,765 | 3/1963 | Kompelien | 250—221 |
| 3,142,039 | 7/1964 | Irland et al. | 178—18 X |

MALCOLM A. MORRISON, *Primary Examiner*.

NEIL C. READ, IRVING L. SRAGOW, *Examiners*.